United States Patent [19]

Jeon

[11] Patent Number: 5,682,260
[45] Date of Patent: Oct. 28, 1997

[54] ACTUATED MIRROR ARRAY WITH ACTIVE MATRIX SUBSTRATE HAVING ARRAY OF MOSFETS

[75] Inventor: Yong-Bae Jeon, Seoul, Rep. of Korea

[73] Assignee: Daewoo Electronics Co., Ltd., Seoul, Rep. of Korea

[21] Appl. No.: 238,132

[22] Filed: May 4, 1994

[30] Foreign Application Priority Data

May 4, 1993 [KR] Rep. of Korea ............. 93-7678

[51] Int. Cl.⁶ .................. G02B 5/08; G02B 26/08; H04R 17/00; H01L 41/04
[52] U.S. Cl. .................. 359/224; 359/291; 359/295; 359/855; 310/328; 310/366
[58] Field of Search .................. 359/224, 225, 359/245, 291, 295, 846, 849, 850, 851, 855; 310/328, 366

[56] References Cited

U.S. PATENT DOCUMENTS

| | | | |
|---|---|---|---|
| 5,083,856 | 1/1992 | Hornbeck | 359/846 |
| 5,144,472 | 9/1992 | Sang, Jr. et al. | 359/245 |
| 5,172,262 | 12/1992 | Hornbeck | 359/223 |
| 5,233,456 | 8/1993 | Nelson | 359/846 |
| 5,469,302 | 11/1995 | Lim | 359/291 |
| 5,506,720 | 4/1996 | Yoon | 359/291 |
| 5,552,923 | 9/1996 | Min | 359/291 |
| 5,585,956 | 12/1996 | Lee et al. | 359/224 |

*Primary Examiner*—Ricky D. Shafer
*Attorney, Agent, or Firm*—Anderson Kill & Olick, P.C.

[57] ABSTRACT

An M×N actuated mirror array for use in an optical projection system, wherein M and N are integers, including: an array of M×N electrodisplacive actuators wherein each of the M×N electrodisplacive actuators is provided with a top surface, a bottom surface, a pair of external sides and has a bimorph structure having a pair of layers of an electrodisplacive material, a common signal electrode located between the pair of layers of the electrodisplacive material, and a pair of reference electrodes provided on the external sides thereof an array of M×N mirrors wherein each of M×N mirrors is coupled with each of the M×N electrodisplacive actuators and is mounted on the top surface of each of the M×N actuators an active matrix substrate comprising a substrate and an array of M×N second conductive type MOSFETs formed on the substrate; and an array of M×N connecting terminals wherein each of the M×N connecting terminals, located between each of the actuators and the substrate, is used for electrically connecting the common signal electrode of each of the actuators with each of the MOSFETs.

3 Claims, 2 Drawing Sheets

ACTUATED MIRROR ARRAY WITH ACTIVE MATRIX SUBSTRATE HAVING ARRAY OF MOSFETS

FIELD OF THE INVENTION

The present invention relates to an optical projection system; and, more particularly, to an M×N actuated mirror array with an active matrix substrate having an array of M×N metal-oxide-semiconductor-field-effect-transistors (MOSFET).

BACKGROUND OF THE INVENTION

Among the various video display systems available in the art, an optical projection system is known to be capable of providing a high quality display in a large scale. In such an optical projection system, light from a lamp is uniformly illuminated onto, e.g., an array of M×N actuated mirrors wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of a baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is shown a cross sectional view of a prior art M×N actuated mirror array 10 comprising an active matrix substrate 11, an array 3 of M×N actuators, e.g., 30, 30', 30", a corresponding array 5 of M×N mirrors, e.g., 50, 50', 50" and a corresponding array 2 of M×N connecting terminals, e.g., 20, 20',20". Each of the actuators, e.g., 30, in turn, is provided with a top surface 32, a bottom surface 33 and a pair of external sides 38a, 38b; and is comprised of a pair of electrodisplacive members 31a, 31b, a common signal electrode 36 located between the pair of electrodisplacive members and a pair of reference electrodes 37a, 37b on the pair of external sides 38a, 38b of the actuator, respectively. A mirror 50 is mounted on the top surface 31 of each of the M×N actuators.

In copending, commonly assigned applications, U.S. Ser. No. 08/216,754, entitled "ACTUATOR ARRAY AND METHOD FOR MANUFACTURE THEREOF" and U.S. Ser. No. 08/216,755, entitled "MIRROR ARRAY AND METHOD FOR THE MANUFACTURE THEREOF", there are disclosed methods for manufacturing such an array of electrodisplacive actuators and for attaching the mirrors thereon.

The active matrix substrate is usually made of an array of thin-film-transistors(TFT) formed on an insulating substrate. The active matrix substrate 11 shown in FIG. 1 is comprised of an array 6 of M×N amorphous silicon(a-Si) TFTs, e.g., 60, 60', 60", having a reverse Stagger-type structure, formed on an insulating substrate 13 made of, e.g., glass, wherein each of a-Si TFTs, e.g., 60, is comprised of a gate electrode 15, a source and drain electrodes 23, 24, a gate insulator 17, an a-Si layer 19, an n⁺ a-Si layer 21 and a protective layer 25.

The gate electrode 15, made of aluminum (Al), is located on the insulating substrate 13, and is covered with the gate insulator 17, comprised of double layers of an anodized alumina ($Al_2O_3$) and silicon nitride ($Si_aN_b$), wherein a and b are integers, thereby insulating thereof.

The a-Si layer 19 is located on top of the gate insulator 17, and the n⁺ a-Si layer 19, which is placed on top of the former, is divided into two separate parts to be individually used as a source and a drain, while the a-Si layer 19 functions as a channel therebetween. In addition, the source and the drain electrodes 23, 24, are formed on top of the n⁺ a-Si layer 19 and completely cover the gate insulator 17. The protective layer is formed on top of the source and the drain electrodes 23, 24. Furthermore, there is a connecting terminal 20, made of Al, on the drain electrode 24, connecting the common signal electrode 36 and the drain electrode 24.

A synchronization and an image signals enter simultaneously the gate electrode 15 and the source electrode 23. The synchronization signal forms a channel between the n⁺ a-Si layer 21 and the a-Si layer 19, through which the image signal is transmitted to the drain electrode 24. The image signal is then sent to the common signal electrode 36 in the actuator via the connecting terminal 20. When a voltage is applied between the common signal electrode 36 and the reference electrodes 37a, 37b, the electrodisplacive material located between them will deform in a direction determined by the polarity of the voltage.

One of the major problems associated with the above-described actuated mirror array is that, since the TFTs are made of a-Si, it is slow in responding to an input signal due to the low carrier mobility therein.

In addition, presence of defects and crystalline imperfections which may occur during the complicated process for manufacturing a-Si may make it highly difficult to attain the desired reproducibility and reliability of the product.

SUMMARY OF THE INVENTION

It is, therefore, a primary object of the present invention to provide an improved active matrix substrate for an M×N actuated mirror array having a faster response time.

It is another object of the present invention to provide an active matrix substrate for an M×N actuated mirror array which is highly reliable and easy to manufacture.

It is a further object of the present invention to provide an M×N actuated mirror array having a faster response time, being highly reliable and easy to manufacture.

In accordance with one aspect of the present invention, there is provided an active matrix substrate for an M×N actuated mirror array for use in an optical projection system, wherein M and N are integers, comprising:

a substrate made of a first conductive type single crystal silicon wafer; and an array of M×N second conductive type MOSFETs formed on said substrate.

In accordance with another aspect of the present invention, there is provided an M×N actuated mirror array for use in an optical projection system, wherein M and N are integers, comprising:

an array of M×N electrodisplacive actuators wherein each of the M×N actuators is provided with a top surface, a bottom surface and a pair of external sides, and is comprised of a pair of layers of an electrodisplacive material, a common signal electrode located between the pair of layers of the electrodisplacive material, and a pair of reference electrodes provided on the pair of external sides of the actuator;

an array of M×N mirrors wherein each of the mirrors is coupled with each of the actuators and is mounted on the top surface thereof;

an active matrix substrate comprising a substrate made of a first conductive type single crystal silicon wafer and an array of M×N second conductive type MOSFETs formed thereon; and an array of M×N connecting terminals, wherein each of the connecting terminals is used for electrically connecting the common signal electrode in each of the M×N actuators with each of the M×N MOSFETs.

BRIEF DESCRIPTION OF THE DRAWINGS

The above and other objects and features of the present invention will become apparent from the following description of preferred embodiments given in conjunction with the accompanying drawings, wherein.

DETAILED DESCRIPTION OF THE PREFERRED EMBODIMENTS

Figure 1:
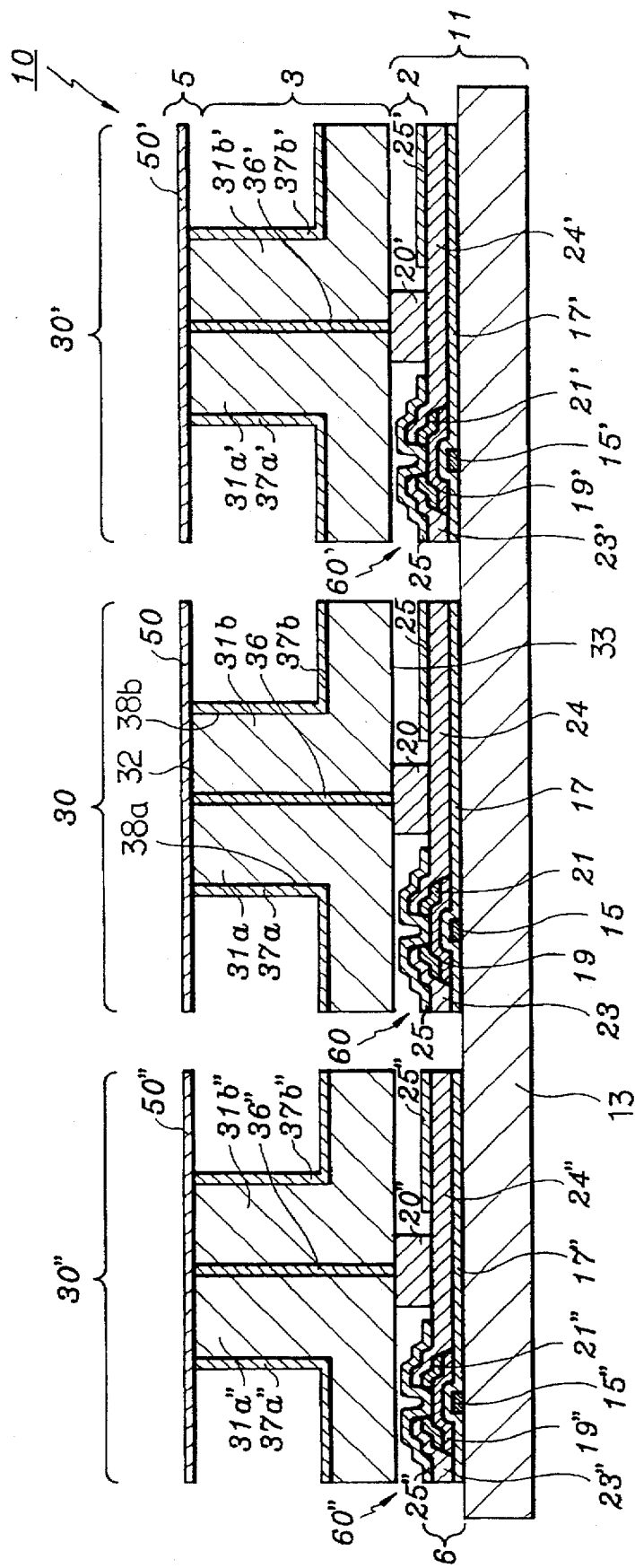
FIG. 1 shows a cross sectional view of a prior art M×N actuated mirror array with an active matrix substrate comprising an array of M×N TFTs on an insulating substrate.
Figure 2:
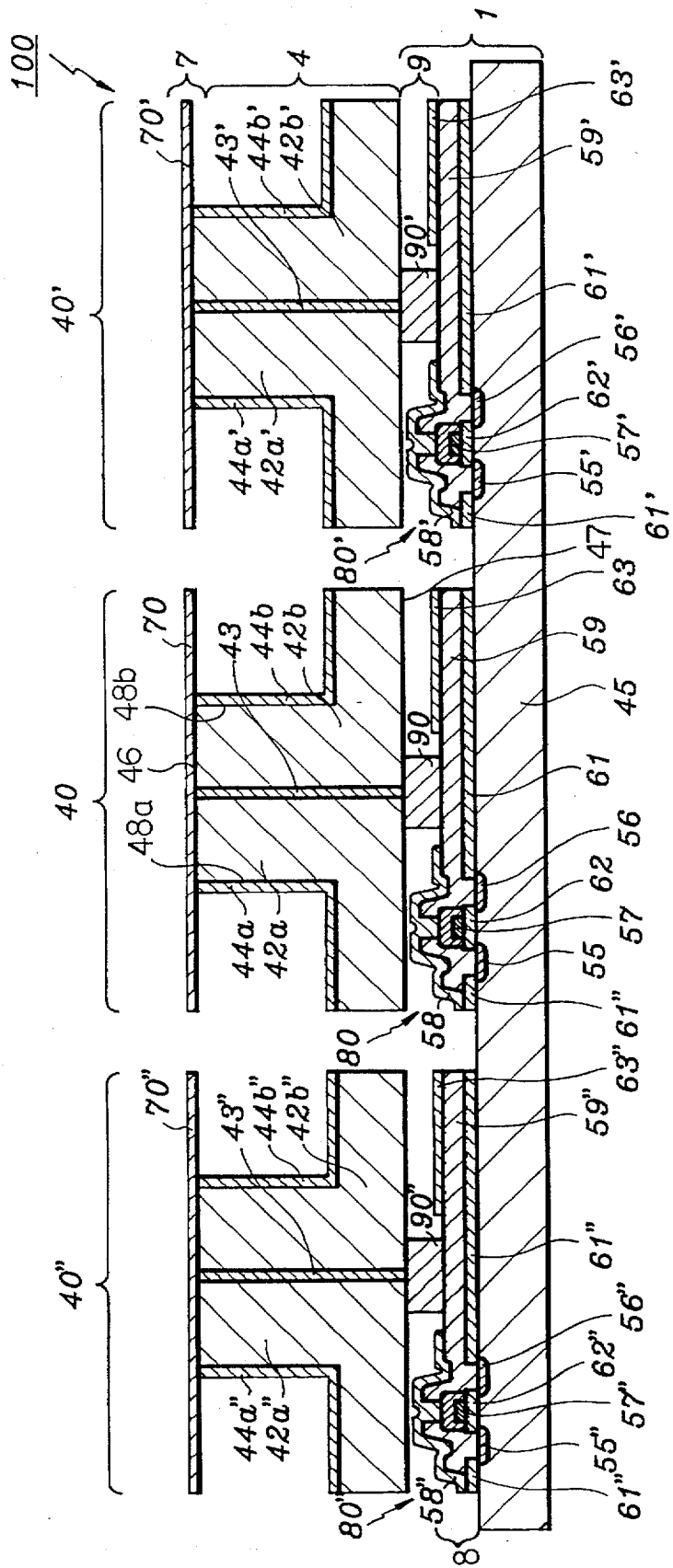
FIG. 2 illustrates a cross sectional view of an M×N actuated mirror array of a preferred embodiment of the present invention.

There is illustrated in FIG. 2 a cross sectional view of an M×N actuated mirror array 100, wherein M and N are integers, for an optical projection system in accordance with a preferred embodiment of the present invention, comprising an array 4 of M×N actuators, e.g., 40, 40', 40", a corresponding array 7 of M×N mirrors, e.g., 70, 70', 70", a corresponding array 9 of M×N connecting terminals, e.g., 90, 90', 90", and an active matrix substrate 1. Each of the M×N actuators, e.g., 40, is provided with a top surface 46, a bottom surface 47, and a pair of external sides 48a, 48b; and is comprised of a pair of electrodisplacive members 42a, 42b, a common signal electrode 43 located between the pair of electrodisplacive members and a pair of reference electrodes 44a, 44b on the pair of external sides 48a, 48b of the actuator 40. Further, each of the M×N mirrors, e.g., 70, is mounted on the top surface 46 of each of the M×N actuators.

In copending, commonly assigned applications, U.S. Ser. No. 08/216,754, entitled "ACTUATOR ARRAY AND METHOD FOR THE MANUFACTURE THEREOF" and U.S. Ser. No. 08/216,755, entitled "MIRROR ARRAY AND METHOD FOR THE MANUFACTURE THEREOF", there are disclosed methods for manufacturing such an array of M×N electrodisplecive actuators and for attaching the mirrors thereon.

The active matrix substrate 1 shown in FIG. 2 is comprised of an array 8 of M×N p-type MOSFETS, e.g., 80, 80', 80", formed on an n-type single crystal silicon wafer 45, and each of the M×N connecting terminals, e.g., 90, for connecting electrically the common signal electrode 43 in each of the M×N actuators with each of the MOSFETs, e.g., 80, is made of an electrically conductive material, e.g., Al.

Further, each of the M×N p-type MOSFETs, e.g., 80, includes a p-type source 55, a p-type drain 56, a gate electrode 57, a source and a drain electrodes, 58, 59, a gate insulator 61, a gate oxidizing film 62 and a protective layer 63 on an n-type single crystal silicon wafer 45, obtained by doping a single crystal silicon wafer with n-type impurities, e.g., phosphorous(P) or arsenic(As).

The gate electrode 57, made of polycrystalline silicon (poly-Si), is located on top of the gate insulating film 62 formed on top of the n-type single crystal silicon wafer 45, and is covered with the gate insulator 61, made of $SiO_2$, to thereby insulate thereof.

The p-type source and the p-type drain, doped with a large concentration of a p-type dopant, e.g., boron(B), are located on two opposite sides of the drain electrode 57, and the source and the drain electrodes 58, 59, on the respective tops thereof. The protective layer 63 is formed on top of the source and the drain electrodes 58,59. Furthermore, there is a connecting terminal 90, made of Al, on the drain electrode 59, connecting electrically the common signal electrode 43 in each of the actuators and the drain electrode 59.

A synchronization and an image signals simultaneously enter the gate electrode 57 and the source electrode 58. The sychronization signal forms a p-type channel between the p-type source 55 and the p-type drain 56, through which the image signal is transmitted to the drain electrode 59. The image signal is then sent to the common signal electrode 36 in the actuator, e.g., 40, via the connecting terminal, e.g., 90.

When a voltage is applied between the common signal electrode 43 and the pair of reference electrodes 44a, 44b, the electrodisplacive material located between them will deform in a direction determined by the polarity of the voltage.

It should be noted that, in the preferred embodiment of the present invention shown in FIG. 2, comprising an array of actuators and an active matrix substrate with an array of M×N MOSFETS thereon, wherein each of the actuators has a bimorph structure and each of the MOSFETs is a p-type, it is possible to replace each of the actuators with a different type, e.g., unimorph, monomorph, shear mode, and each of the MOSFETs with an n-type.

Since the MOSFETs are formed on a single crystal silicon wafer, it is extremely fast in responding to an input signal due to the high carrier mobility therein. In addition, since a single crystal silicon wafer contains a very low concentration of crystalline imperfection and defects, it is easy to obtain the desired reproducibility and reliability in the completed actuated mirror array.

While the present invention has been shown and described with reference to the particular embodiments, it will be apparent to those skilled in the art that many changes and modifications may be made without departing from the spirit and scope of the invention as defined in the appended claims.

What is claimed is:

1. An M×N actuated mirror array for use in an optical projection system, wherein M and N are integers, comprising:

an array of M×N electrodisplacive actuators wherein each of the M×N electrodisplacive actuators is provided with a top surface, a bottom surface, a pair of external sides and has a bimorph structure having a pair of layers of an electrodisplacive material, a common signal electrode located between the pair of layers of the electrodisplacive material, and a pair of reference electrodes provided on the external sides thereof;

an array of M×N mirrors wherein each of M×N mirrors is coupled with each of the M×N electrodisplacive actuators and is mounted on the top surface of each of the M×N actuators;

an active matrix substrate comprising a substrate and an array of M×N second conductive type MOSFETs formed on said substrate; and an array of M×N connecting terminals wherein each of the M×N connecting terminals, located between each of the actuators and the substrate, is for electrically connecting the common signal electrode of each of the actuators with each of the MOSFETs.

2. The M×N actuated mirror array of claim 1, wherein said substrate is made of a first conductive type single crystal silicon wafer.

3. The M×N actuated mirror array of claim 2, wherein each of the MOSFETs has a gate electrode, a source and a drain electrodes, a protective layer, a gate oxidizing film, a p-type source and a p-type drain and a gate insulator.

* * * * *